US009583958B2

(12) United States Patent
Miyajima

(10) Patent No.: US 9,583,958 B2
(45) Date of Patent: Feb. 28, 2017

(54) VOLTAGE DETECTING DEVICE

(71) Applicant: Keihin Corporation, Tokyo (JP)

(72) Inventor: Kazuya Miyajima, Shioya-gun (JP)

(73) Assignee: KEIHIN CORPORATION, Tokyo (JP)

( * ) Notice: Subject to any disclaimer, the term of this patent is extended or adjusted under 35 U.S.C. 154(b) by 157 days.

(21) Appl. No.: 14/592,645

(22) Filed: Jan. 8, 2015

(65) Prior Publication Data

US 2015/0207349 A1 Jul. 23, 2015

(30) Foreign Application Priority Data

Jan. 17, 2014 (JP) ................................ 2014-007219

(51) Int. Cl.
H02J 7/00 (2006.01)
H02H 7/18 (2006.01)
H02H 9/04 (2006.01)

(52) U.S. Cl.
CPC .............. H02J 7/0063 (2013.01); H02H 7/18 (2013.01); H02H 9/041 (2013.01); H02J 7/0021 (2013.01); H02J 7/0026 (2013.01); H02J 2007/0037 (2013.01); H02J 2007/0067 (2013.01); Y02T 10/7055 (2013.01)

(58) Field of Classification Search
CPC ................. H02J 2007/0037; H02J 2007/0067; H02J 7/0021; H02J 7/0026; H02J 7/0063; H02H 7/18; H02H 9/041
USPC .................................................. 320/118, 122
See application file for complete search history.

(56) References Cited

U.S. PATENT DOCUMENTS

| 2009/0267566 | A1* | 10/2009 | Yano | B60L 11/1861 320/118 |
| 2009/0309545 | A1* | 12/2009 | Kunimitsu | G01R 31/3658 320/118 |
| 2011/0011653 | A1* | 1/2011 | Mizutani | B60L 11/1864 180/65.1 |
| 2011/0149454 | A1* | 6/2011 | Shibuya | H01M 2/34 361/87 |
| 2012/0161693 | A1* | 6/2012 | Nishizawa | G01R 19/0084 320/103 |

FOREIGN PATENT DOCUMENTS

| JP | 2008-193887 A | 8/2008 |
| JP | 2009-219215 A | 9/2009 |
| JP | 2013-121246 A | 6/2013 |

* cited by examiner

Primary Examiner — Nathaniel Pelton
(74) Attorney, Agent, or Firm — Westerman, Hattori, Daniels & Adrian, LLP

(57) ABSTRACT

A voltage detecting device includes a voltage detecting circuit configured to detect voltages of a plurality of battery cells constituting a battery; a plurality of voltage detecting lines connecting the respective battery cells to the voltage detecting circuit; discharging circuits connecting the respective voltage detecting lines to a ground, and discharging the battery cells in an overcharged state; a power adjusting section adjusting power of the battery, and supplying the voltage detecting circuit with the adjusted power as driving power; the voltage detecting circuit detecting the voltages of the respective battery cells via the voltage detecting lines; and an overvoltage protecting circuit protecting the voltage detecting circuit from voltage equal to or higher than a predetermined threshold value, the voltage being generated in the voltage detecting lines, the discharging circuits, and the power adjusting section.

1 Claim, 3 Drawing Sheets

VOLTAGE DETECTING DEVICE

CROSS REFERENCE TO RELATED APPLICATION

The present application claims priority under 35 U.S.C. §119 to Japanese Patent Application No. 2014-007219 filed in the Japan Patent Office on Jan. 17, 2014, the entire content of which is hereby incorporated by reference.

TECHNICAL FIELD

The present invention relates to a voltage detecting device.

BACKGROUND OF THE INVENTION

A battery module that can prevent an overvoltage from being applied to a voltage measuring section when a disconnection occurs between battery cells is disclosed in Japanese Patent Laid-Open No. 2013-121246 ("JP '246"), which describes a battery module includes a plurality of battery cells connected in series with each other; a voltage measuring section measuring respective voltages of the plurality of battery cells; voltage measuring lines establishing connections between the voltage measuring section and the battery cells; overcurrent protecting circuits inserted in the voltage measuring lines, each of the overcurrent protecting circuits being formed by connecting an overcurrent interrupting element and an overcurrent preventing element in series with each other; and reverse voltage protective diodes each having a cathode connected in parallel with a corresponding battery cell via an overcurrent interrupting element on a positive electrode side of the battery cell and having an anode connected in parallel with the corresponding battery cell via an overcurrent interrupting element on a negative electrode side of the battery cell. The overcurrent interrupting elements are formed by a fuse.

SUMMARY OF THE INVENTION

In JP '246, the voltage measuring section is protected from overcurrent by fuses. However, because fuses are used, when an overvoltage is generated, the voltage measuring section may not be protected from the generated overvoltage.

The present invention protects a voltage detecting circuit from overvoltage.

According to one embodiment of the present invention, a voltage detecting device includes a voltage detecting circuit, a plurality of voltage detecting lines, discharging circuits, a power adjusting section, and an overvoltage protecting circuit. The voltage detecting circuit is configured to detect voltages of a plurality of battery cells constituting a battery. The plurality of voltage detecting lines connect the respective battery cells to the voltage detecting circuit. The discharging circuits connect the respective voltage detecting lines to a ground, and discharge the battery cells in an overcharged state. The power adjusting section adjusts power of the battery and supplies the voltage detecting circuit with the adjusted power as driving power. The voltage detecting circuit detects the voltages of the respective battery cells via the voltage detecting lines. The overvoltage protecting circuit protects the voltage detecting circuit from voltage equal to or higher than a predetermined threshold value, the voltage being generated in the voltage detecting lines, the discharging circuits, and the power adjusting section.

According to another embodiment of the present invention, the overvoltage protecting circuit described also includes a Zener diode, a switching element, a resistor, a plurality of first diodes, a plurality of second diodes, and a third diode. A current flows through the Zener diode when a voltage equal to or higher than the predetermined threshold value is applied to the Zener diode. The switching element includes three terminals, a control terminal of the three terminals being connected to an anode terminal of the Zener diode, a first terminal of the two remaining terminals being connected to a cathode terminal of the Zener diode, and a second terminal being connected to the ground. The resistor being configured to adjust a current input to the control terminal of the switching element, the resistor having a first terminal connected to the anode terminal of the Zener diode, and having a second terminal connected to the ground. The plurality of first diodes are provided for the respective voltage detecting lines, the plurality of first diodes each having an anode terminal connected to a corresponding voltage detecting line, and having a cathode terminal connected to the cathode terminal of the Zener diode. The plurality of second diodes provided for the respective discharging circuits, the plurality of second diodes each having an anode terminal connected to a corresponding discharging circuit, and having a cathode terminal connected to the cathode terminal of the Zener diode. The third diode has an anode terminal connected to the power adjusting section, and having a cathode terminal connected to the cathode terminal of the Zener diode.

According to another embodiment of the present invention, the overvoltage protecting circuit includes a Zener diode, a plurality of first diodes, a plurality of second diodes, and a third diode. Current flows through the Zener diode when a voltage equal to or higher than the predetermined threshold value is applied to the Zener diode, the Zener diode having an anode terminal connected to the ground. The plurality of first diodes are provided for the respective voltage detecting lines, the plurality of first diodes each having an anode terminal connected to a corresponding voltage detecting line, and having a cathode terminal connected to a cathode terminal of the Zener diode. The plurality of second diodes are provided for the respective discharging circuits, the plurality of second diodes each having an anode terminal connected to a corresponding discharging circuit, and having a cathode terminal connected to the cathode terminal of the Zener diode. The third diode has an anode terminal connected to the power adjusting section, and having a cathode terminal connected to the cathode terminal of the Zener diode.

According to another embodiment of the present invention, the overvoltage protecting circuit includes a switching element; a control unit, a plurality of first diodes, a plurality of second diodes, and a third diode. The control unit is configured to set the switching element in an on state when a voltage equal to or higher than the predetermined threshold value is generated in the voltage detecting lines, the discharging circuits, and the power adjusting section. The plurality of first diodes are provided for the respective voltage detecting lines, the plurality of first diodes each having an anode terminal connected to a corresponding voltage detecting line, and having a cathode terminal connected to one end of the switching element. The plurality of second diodes are provided for the respective discharging circuits, the plurality of second diodes each having an anode terminal connected to a corresponding discharging circuit, and having a cathode terminal connected to the one end of the switching element. The third diode has an anode terminal connected to the power adjusting section, and having a cathode terminal connected to the one end of the switching element.

According to the embodiments of the present invention, by providing the overvoltage protecting circuit that protects the voltage detecting circuit from voltage equal to or higher than the predetermined threshold value which voltage is generated in the voltage detecting lines, the discharging circuits, and the power adjusting section, the voltage detecting circuit can be protected from overvoltages.

BRIEF DESCRIPTION OF THE DRAWINGS

The advantages of this invention will become apparent in the following description taken in conjunction with the drawings, wherein.

DETAILED DESCRIPTION OF THE INVENTION

Figure 1:
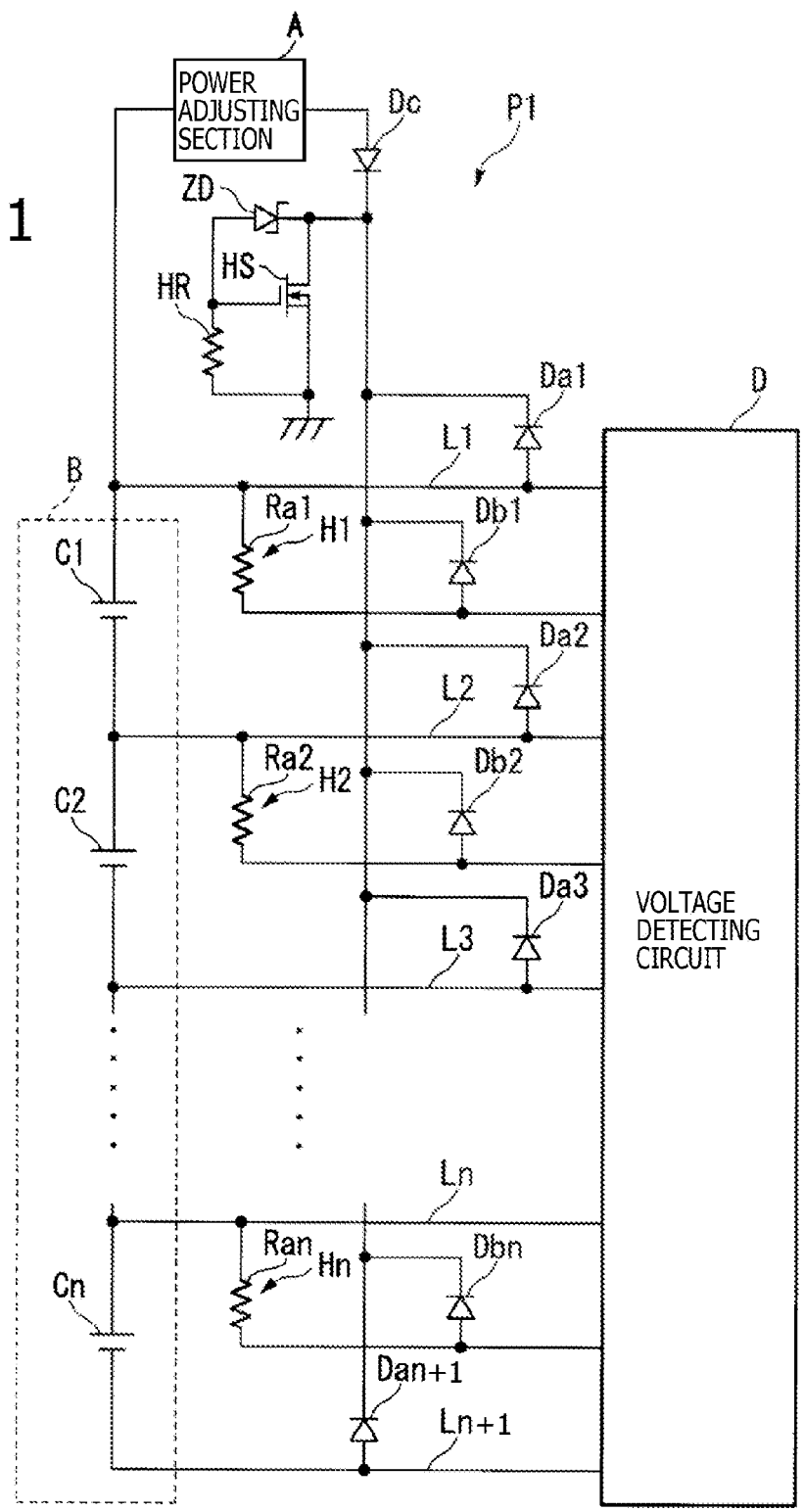
FIG. 1 is a circuit diagram of a voltage detecting device according to one embodiment.

A voltage detecting device according to an embodiment illustrated in FIG. 1 is described. According to this embodiment, the voltage detecting device is mounted in a moving vehicle such as an electric vehicle (EV), a hybrid vehicle (HV), or the like, and monitors the voltage states of respective battery cells C1 to Cn constituting a battery B. The voltage detecting device includes, as shown in FIG. 1, voltage detecting lines L1 to Ln+1, discharging circuits H1 to Hn, a power adjusting section A, an overvoltage protecting circuit P1 and a voltage detecting circuit D, and a microcomputer M (not shown). The voltage detecting lines L1 to Ln+1, the discharging circuits H1 to Hn, the power adjusting section A, the overvoltage protecting circuit P1, the voltage detecting circuit D, and the microcomputer M are mounted on a board not shown in the figure.

The voltage detecting lines L1 to Ln+1 are conductors that connect the battery cells C1 to Cn to the voltage detecting circuit D. The voltage detecting circuit D detects the voltages of powers of the respective battery cells C1 to Cn which voltages are input via the voltage detecting lines L1 to Ln+1.

The discharging circuits H1 to Hn are circuits that connect the voltage detecting lines L1 to Ln+1 to a ground to discharge the battery cells C1 to Cn in an overcharged state. As shown in FIG. 1, the discharging circuits H1 to Hn include discharging resistors Ra1 to Ran, respectively. Incidentally, because the discharging circuits H1 to Hn have the same configuration, only the discharging resistor Ra1 of the discharging circuit H1 will be described, and description of the discharging resistors Ra2 to Ran of the discharging circuits H2 to Hn will be omitted.

The discharging resistor Ra1 has one end connected to the positive electrode of the battery cell C1 via the voltage detecting line L1, and has another end connected to the voltage detecting circuit D. The other end of the discharging resistor Ra1, which other end is shown connected to the voltage detecting circuit D, is connected to the ground via a switching element provided within the voltage detecting circuit D.

When the switching element within the voltage detecting circuit D described above is set in an on state, the discharging resistor Ra1 is supplied with power from the battery cell C1, and converts the power into thermal energy, that is, generates heat. The voltage detecting circuit D turns on the switching element when the battery cell C1 has reached an overcharged state. The battery cell C1 in an overcharged state is thus discharged by the discharging circuit H1.

The power adjusting section A adjusts the power of the battery B, and supplies the voltage detecting circuit D with the adjusted power as driving power. The power adjusting section A is for example a DC-to-DC converter.

The overvoltage protecting circuit P1 protects the voltage detecting circuit D from voltage equal to or higher than a predetermined threshold value which voltage is generated in the voltage detecting lines L1 to Ln+1, the discharging circuits H1 to Hn, and the power adjusting section A. The overvoltage protecting circuit P1 includes a Zener diode ZD, a protective switching element HS, a protective resistor HR, first diodes Da1 to Dan+1, second diodes Db1 to Dbn, and a third diode Dc.

The Zener diode ZD is connected to the voltage detecting lines L1 to Ln+1, the discharging circuits H1 to Hn, and the power adjusting section A via the first diodes Da1 to Dan+1, the second diodes Db1 to Dbn, and the third diode Dc. The Zener diode ZD allows a current to flow in a direction from the cathode terminal to the anode terminal of the Zener diode ZD when voltage equal to or higher than the predetermined threshold value which voltage is generated in the voltage detecting lines L1 to Ln+1, the discharging circuits H1 to Hn, and the power adjusting section A is applied to the cathode terminal The protective switching element HS is for example a bipolar transistor. The protective switching element HS has a base terminal (control terminal) connected to the anode terminal of the Zener diode ZD, has an emitter terminal connected to the cathode terminal of the Zener diode, and has a collector terminal connected to the ground.

When a voltage equal to or higher than the predetermined threshold value is generated in the voltage detecting lines L1 to Ln+1, the discharging circuits H1 to Hn, and the power adjusting section A, and the voltage is applied to the Zener diode ZD, the protective switching element HS is set in an on state to discharge a power having the above-described voltage equal to or higher than the predetermined threshold value to the ground.

When no voltage equal to or higher than the predetermined threshold value is generated in any of the voltage detecting lines L1 to Ln+1, the discharging circuits H1 to Hn, and the power adjusting section A, on the other hand, the protective switching element HS is set in an off state to stop discharging from the voltage detecting lines L1 to Ln+1, the discharging circuits H1 to Hn, and the power adjusting section A to the ground.

The protective switching element HS may also be other than a bipolar transistor, for example a FET (Field Effect Transistor) or an IGBT (Insulated Gate Bipolar Transistor).

The protective resistor HR has one terminal connected to the anode terminal of the Zener diode ZD, and has another terminal connected to the ground. The protective resistor HR is provided to adjust current input from the voltage detecting lines L1 to Ln+1, the discharging circuits H1 to Hn, and the power adjusting section A to the base terminal (control terminal) of the protective switching element HS via the Zener diode ZD.

The first diode Da1 is provided so as to correspond to the voltage detecting line L1. The first diode Da1 has an anode terminal connected to the voltage detecting line L1, and has a cathode terminal connected to the cathode terminal of the Zener diode ZD. In addition, as with the first diode Da1, the first diodes Da2 to Dan+1 are provided to the respective voltage detecting lines L2 to Ln+1.

The second diode Db1 is provided so as to correspond to the discharging circuit H1. The second diode Db1 has an anode terminal connected to the discharging circuit H1, and has a cathode terminal connected to the cathode terminal of the Zener diode ZD. In addition, as with the second diode Db1, the second diodes Db2 to Dbn are provided to the respective discharging circuits H2 to Hn.

The third diode Dc has an anode terminal connected to the power adjusting section A, and has a cathode terminal connected to the cathode terminal of the Zener diode ZD.

The voltage detecting circuit D is a dedicated IC chip that detects the voltage of each of the battery cells C1 to Cn and which has an A/D converting function of converting a result of the detection into digital data (voltage detection data) and a function of communicating with the microcomputer M. Such a voltage detecting circuit D can be operated by a power of a high voltage (for example 60 V). The voltage detecting circuit D is connected to the microcomputer M operable by a low voltage (for example 5 V) via an insulating element such as a photocoupler or the like. Thereby, the voltage detecting circuit D is electrically insulated from the microcomputer M, and is communicatably connected to the microcomputer M.

The microcomputer M is an IC chip including for example a CPU (Central Processing Unit), a ROM (Read Only Memory), a RAM (Random Access Memory), and an interface circuit for transmitting and receiving various kinds of signals to and from the electrically interconnected parts. The microcomputer M is communicatably connected to the voltage detecting circuit D via the above-described insulating element. The microcomputer M controls the operation of the whole of the voltage detecting device by performing various kinds of arithmetic processing on the basis of various kinds of arithmetic control programs stored in the ROM and communicating with the parts.

The operation of the thus formed present voltage detecting device will next be described.

In the present voltage detecting device, when a sudden overvoltage is generated in the voltage detecting lines L1 to Ln+1, the discharging circuits H1 to Hn, and the power adjusting section A, the overvoltage protecting circuit P1 performs the following characteristic operation. When an overvoltage exceeding the predetermined threshold value is generated in the voltage detecting lines L1 to Ln+1, the discharging circuits H1 to Hn, and the power adjusting section A, the overvoltage is applied to the cathode terminal of the Zener diode ZD in the overvoltage protecting circuit P1 so that a current starts to flow in a direction from the cathode terminal to the anode terminal of the Zener diode ZD.

As a result, a current is input from the Zener diode ZD to the control terminal of the protective switching element HS, so that the protective switching element HS is set in an on state. Thus, the overvoltage exceeding the predetermined threshold value which overvoltage is generated in the voltage detecting lines L1 to Ln+1, the discharging circuits H1 to Hn, and the power adjusting section A is discharged to the ground. Therefore the voltage detecting circuit D can be protected from the overvoltage.

For example, supposing that the withstand voltage of the voltage detecting circuit D is 80 V, and that the above predetermined threshold value is 75 V, the Zener diode ZD that allows a current to flow when 75 V is applied to the cathode terminal is provided in the overvoltage protecting circuit P1. When an overvoltage exceeding 75 V is generated in the voltage detecting lines L1 to Ln+1, the discharging circuits H1 to Hn, and the power adjusting section A, the overvoltage exceeding 75 V is applied to the cathode terminal of the Zener diode ZD, and a current starts to flow from the cathode terminal to the anode terminal in the Zener diode ZD, so that the protective switching element HS is set in an on state. Thus, the overvoltage exceeding 75 V is discharged to the ground. Therefore the voltage detecting circuit D can be protected from the overvoltage.

According to such a present embodiment, by providing the overvoltage protecting circuit P1 that protects the voltage detecting circuit D from voltage equal to or higher than the predetermined threshold value which voltage is generated in the voltage detecting lines L1 to Ln+1, the discharging circuits H1 to Hn, and the power adjusting section A, the voltage detecting circuit D can be protected from overvoltages equal to or higher than the predetermined threshold value.

A voltage detecting device according to an embodiment illustrated in FIG. 2 will next be described.

The voltage detecting device according to this embodiment is different in the following respect from the foregoing embodiment illustrated in FIG. 1 and described above. As shown in FIG. 2, the voltage detecting device according to the present embodiment is different from the embodiment illustrated in FIG. 1 in that the configuration of an overvoltage protecting circuit P2 is different from that of the overvoltage protecting circuit P1 in the foregoing embodiment. Other constituent elements are similar to those of the first embodiment. Hence, description of the constituent elements in the second embodiment which constituent elements are similar to those of the first embodiment will be omitted.

As in the embodiment illustrated in FIG. 1, the overvoltage protecting circuit P2 protects a voltage detecting circuit D from voltage equal to or higher than a predetermined threshold value which voltage is generated in voltage detecting lines L1 to Ln+1, discharging circuits H1 to Hn, and a power adjusting section A. The overvoltage protecting circuit P2 includes a Zener diode ZD, first diodes Da1 to Dan+1, second diodes Db1 to Dbn, and a third diode Dc.

The Zener diode ZD is connected to the voltage detecting lines L1 to Ln+1, the discharging circuits H1 to Hn, and the power adjusting section A via the first diodes Da1 to Dan+1, the second diodes Db1 to Dbn, and the third diode Dc. The Zener diode ZD allows a current to flow in a direction from the cathode terminal to the anode terminal of the Zener diode ZD when voltage equal to or higher than the predetermined threshold value which voltage is generated in the voltage detecting lines L1 to Ln+1, the discharging circuits H1 to Hn, and the power adjusting section A is applied to the cathode terminal The anode terminal of the Zener diode ZD is connected to a ground.

The first diode Da1 is provided so as to correspond to the voltage detecting line L1. The first diode Da1 has an anode terminal connected to the voltage detecting line L1, and has a cathode terminal connected to the cathode terminal of the Zener diode ZD. In addition, as with the first diode Da1, the first diodes Da2 to Dan+1 are provided to the respective voltage detecting lines L2 to Ln+1.

The second diode Db1 is provided so as to correspond to the discharging circuit H1. The second diode Db1 has an anode terminal connected to the discharging circuit H1, and has a cathode terminal connected to the cathode terminal of the Zener diode ZD. In addition, as with the second diode Db1, the second diodes Db2 to Dbn are provided to the respective discharging circuits H2 to Hn.

The third diode Dc has an anode terminal connected to the power adjusting section A, and has a cathode terminal connected to the cathode terminal of the Zener diode ZD.

For example, supposing that the withstand voltage of the voltage detecting circuit D is 80 V, and that the above predetermined threshold value is 75 V, the Zener diode ZD that allows a current to flow when 75 V is applied to the cathode terminal is provided in the overvoltage protecting circuit P2. When an overvoltage exceeding 75 V is generated in the voltage detecting lines L1 to Ln+1, the discharging circuits H1 to Hn, and the power adjusting section A, the overvoltage exceeding 75 V is applied to the cathode terminal of the Zener diode ZD, and a current starts to flow from the cathode terminal to the anode terminal in the Zener diode ZD. Thus, the overvoltage exceeding 75 V is discharged to the ground via the Zener diode ZD. Therefore the voltage detecting circuit D can be protected from the overvoltage.

According to this embodiment, by providing the overvoltage protecting circuit P2 that protects the voltage detecting circuit D from voltage equal to or higher than the predetermined threshold value which voltage is generated in the voltage detecting lines L1 to Ln+1, the discharging circuits H1 to Hn, and the power adjusting section A, the voltage detecting circuit D can be protected from overvoltages.

A voltage detecting device according to an embodiment illustrated in FIG. 3 will next be described.

The voltage detecting device according to this embodiment is different in the following respect from the foregoing embodiment illustrated in FIG. 1 and described above. As shown in FIG. 3, the voltage detecting device according to this embodiment is different from the foregoing embodiment illustrated in FIG. 1 in that the configuration of an overvoltage protecting circuit P3 is different from that of the overvoltage protecting circuit P1 in the foregoing embodiment. Other constituent elements are similar to those of the foregoing embodiment. Hence, description of the constituent elements in this embodiment which constituent elements are similar to those of the foregoing embodiment will be omitted.

As in the foregoing embodiment, the overvoltage protecting circuit P3 protects a voltage detecting circuit D from voltage equal to or higher than a predetermined threshold value which voltage is generated in voltage detecting lines L1 to Ln+1, discharging circuits H1 to Hn, and a power adjusting section A. The overvoltage protecting circuit P3 includes a comparator Cp, a control device C, a protective switching element HS, a first protective resistor HR1, a second protective resistor HR2, first diodes Da1 to Dan+1, second diodes Db1 to Dbn, and a third diode Dc. Incidentally, the comparator Cp and the control device C constitute a control unit in the present embodiment.

One of input terminals of the comparator Cp is connected to the cathode terminals of the first diodes Da1 to Dan+1, the second diodes Db1 to Dbn, and the third diode Dc. The other input terminal of the comparator Cp is connected to a ground. The first protective resistor HR1 is provided between the one input terminal and the other input terminal of the comparator Cp. In addition, an output terminal of the comparator Cp is connected to the control device C to output a result of comparison to the control device C.

The control device C controls the protective switching element HS. The control device C determines whether or not a voltage equal to or higher than the predetermined threshold value is generated in the voltage detecting lines L1 to Ln+1, the discharging circuits H1 to Hn, and the power adjusting section A on the basis of the comparison result input from the comparator Cp. When a voltage equal to or higher than the predetermined threshold value is generated in the voltage detecting lines L1 to Ln+1, the discharging circuits H1 to Hn, and the power adjusting section A, the control device C sets the protective switching element HS in an on state.

The protective switching element HS is for example a bipolar transistor. The protective switching element HS has a base terminal (control terminal) connected to the control device C, has an emitter terminal connected to the cathode terminals of the first diodes Da1 to Dan+1, the second diodes Db1 to Dbn, and the third diode Dc, and has a collector terminal connected to the ground via the second protective resistor HR2.

When a voltage equal to or higher than the predetermined threshold value is generated in the voltage detecting lines L1 to Ln+1, the discharging circuits H1 to Hn, and the power adjusting section A, the protective switching element HS is set in an on state by the control device C to discharge a power having the above-described voltage equal to or higher than the predetermined threshold value to the ground.

When no voltage equal to or higher than the predetermined threshold value is generated in any of the voltage detecting lines L1 to Ln+1, the discharging circuits H1 to Hn, and the power adjusting section A, on the other hand, the protective switching element HS is set in an off state by the control device C to stop discharging from the voltage detecting lines L1 to Ln+1, the discharging circuits H1 to Hn, and the power adjusting section A to the ground.

The protective switching element HS may also be other than a bipolar transistor, for example a FET (Field Effect Transistor) or an IGBT (Insulated Gate Bipolar Transistor).

The first protective resistor HR1 is provided between the two input terminals of the comparator Cp.

The second protective resistor HR2 has one terminal connected to the collector terminal of the protective switching element HS, and has another terminal connected to the ground.

For example, supposing that the withstand voltage of the voltage detecting circuit D is 80 V, and that the above predetermined threshold value is 75 V, the control device C determines whether or not an overvoltage equal to or higher than 75 V is generated in the voltage detecting lines L1 to Ln+1, the discharging circuits H1 to Hn, and the power adjusting section A on the basis of a comparison result input from the comparator Cp. When an overvoltage equal to or higher than 75 V is generated, the control device C sets the protective switching element HS in an on state. The overvoltage exceeding 75 V is thereby discharged to the ground via the protective switching element HS, so that the voltage detecting circuit D can be protected from the overvoltage.

According to this embodiment, by providing the overvoltage protecting circuit P3 that protects the voltage detecting circuit D from voltage equal to or higher than the predetermined threshold value which voltage is generated in the voltage detecting lines L1 to Ln+1, the discharging circuits H1 to Hn, and the power adjusting section A, the voltage detecting circuit D can be protected from overvoltages.

Embodiments of the present technology have been described above. However, the present invention is not limited to the foregoing embodiments, but may be modified as follows, for example.

Figure 3:
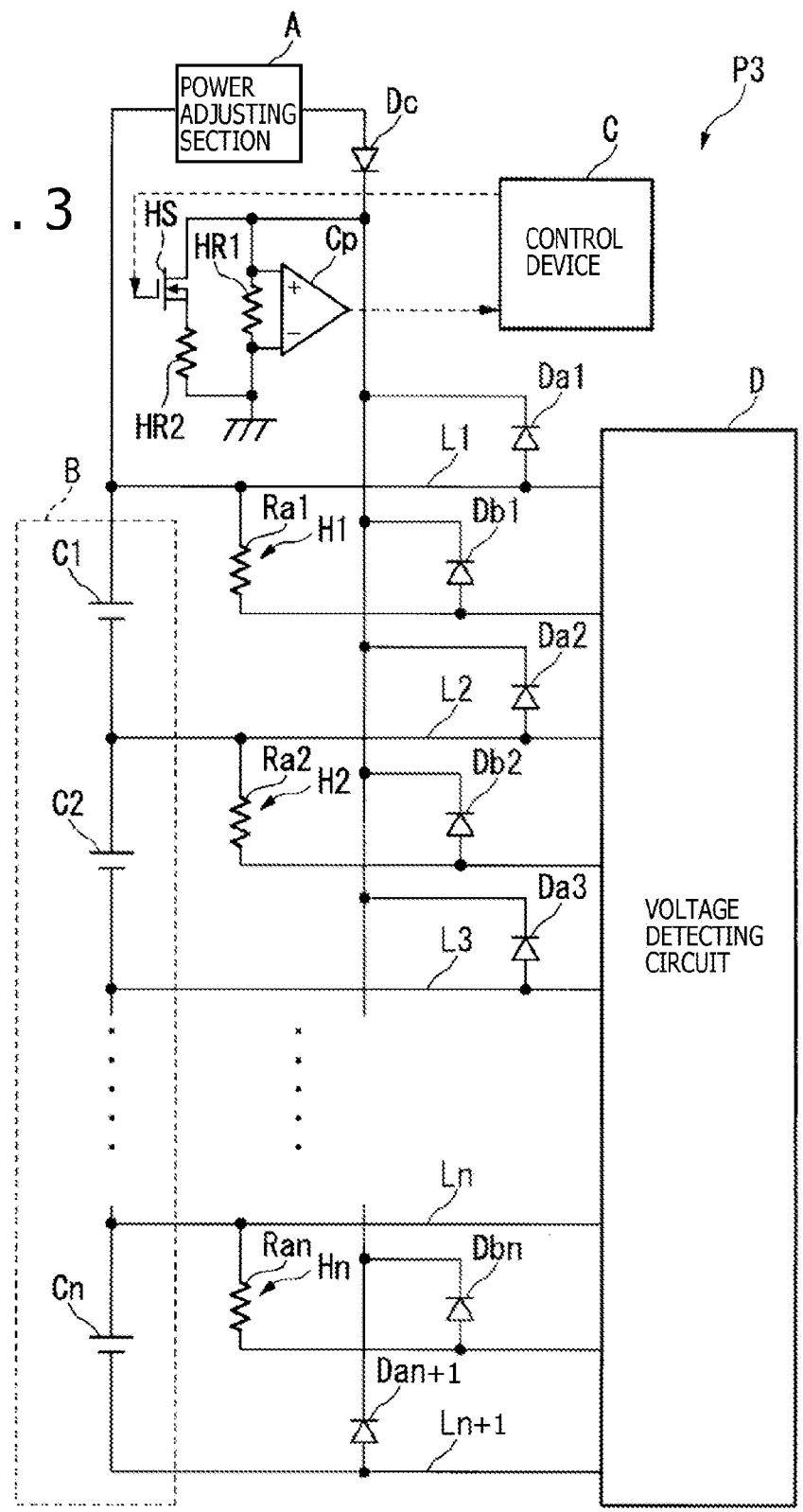
FIG. 3 is a circuit diagram of a voltage detecting device according to another embodiment.

(1) In the embodiment illustrated in FIG. 3 and described above, the control device C is provided as a device different from the voltage detecting circuit D and the microcomputer M. However, the control device C may be integrated with the voltage detecting circuit D or the microcomputer M.

Figure 2:
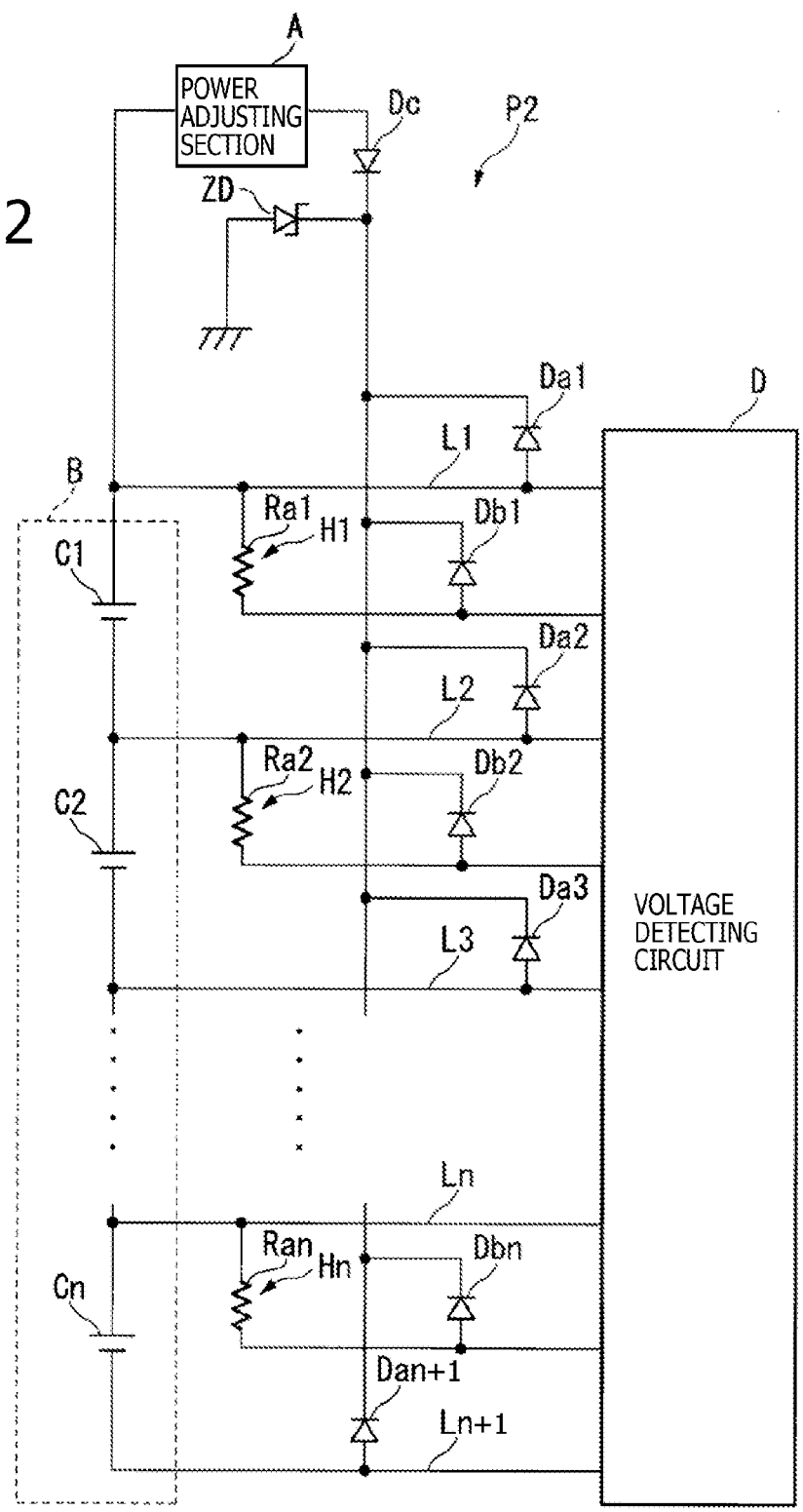
FIG. 2 is a circuit diagram of a voltage detecting device according to another embodiment.

(2) In the foregoing embodiments illustrated in FIGS. 1-3, the discharging resistors Ra1 to Ran of the discharging circuits H1 to Hn are connected to switching elements provided within the voltage detecting circuit D. However, the switching elements may be provided in the discharging circuits H1 to Hn.

It should be understood by those skilled in the art that various modifications, combinations, sub-combinations and alterations may occur depending on design requirements and other factors insofar as they are within the scope of the appended claims or the equivalents thereof.

I claim:

1. A voltage detecting device comprising:
a voltage detecting circuit configured to detect voltages of a plurality of battery cells constituting a battery;
a plurality of voltage detecting lines connecting the respective battery cells to the voltage detecting circuit;
discharging circuits connecting the respective voltage detecting lines to a ground, and discharging the battery cells in an overcharged state;
a power adjusting section adjusting power of the battery, and supplying the voltage detecting circuit with the adjusted power as driving power;
the voltage detecting circuit detecting the voltages of the respective battery cells via the voltage detecting lines; and
an overvoltage protecting circuit protecting the voltage detecting circuit from voltage equal to or higher than a predetermined threshold value, the voltage being generated in the voltage detecting lines, the discharging circuits, and the power adjusting section,
wherein the overvoltage protecting circuit comprises:
a Zener diode through which a current flows when a voltage equal to or higher than the predetermined threshold value is applied to the Zener diode;
a switching element having three terminals, a control terminal of the three terminals being connected to an anode terminal of the Zener diode, a first terminal of the two remaining terminals being connected to a cathode terminal of the Zener diode, and a second terminal being connected to the ground;
a resistor configured to adjust a current input to the control terminal of the switching element, the resistor having a first terminal connected to the anode terminal of the Zener diode, and having a second terminal connected to the ground;
a plurality of first diodes provided for the respective voltage detecting lines, the plurality of first diodes each having an anode terminal connected to a corresponding voltage detecting line, and having a cathode terminal connected to the cathode terminal of the Zener diode;
a plurality of second diodes provided for the respective discharging circuits, the plurality of second diodes each having an anode terminal connected to a corresponding discharging circuit, and having a cathode terminal connected to the cathode terminal of the Zener diode; and
a third diode having an anode terminal connected to the power adjusting section, and having a cathode terminal connected to the cathode terminal of the Zener diode.

* * * * *